(12) United States Patent
Menke et al.

(10) Patent No.: US 11,427,511 B2
(45) Date of Patent: Aug. 30, 2022

(54) STRONGLY SCATTERING CERAMIC CONVERTER AND METHOD FOR PRODUCING SAME

(71) Applicant: Schott AG, Mainz (DE)

(72) Inventors: Yvonne Menke, Mainz (DE); Volker Hagemann, Klein-Winternheim (DE); Bernd Hoppe, Ingelheim (DE)

(73) Assignee: SCHOTT AG, Mainz (DE)

( * ) Notice: Subject to any disclaimer, the term of this patent is extended or adjusted under 35 U.S.C. 154(b) by 554 days.

(21) Appl. No.: 14/809,317

(22) Filed: Jul. 27, 2015

(65) Prior Publication Data

US 2015/0329778 A1 Nov. 19, 2015

Related U.S. Application Data

(63) Continuation of application No. PCT/EP2014/050053, filed on Jan. 3, 2014.

(30) Foreign Application Priority Data

Jan. 28, 2013 (DE) .................. 10 2013 100 832.1

(51) Int. Cl.
*C04B 35/44* (2006.01)
*G02B 5/20* (2006.01)
(Continued)

(52) U.S. Cl.
CPC .............. *C04B 35/44* (2013.01); *B28B 17/00* (2013.01); *C04B 35/01* (2013.01); *C04B 35/62625* (2013.01); *C04B 35/62655* (2013.01); *C04B 35/64* (2013.01); *C09K 11/7774* (2013.01); *G02B 5/20* (2013.01);
(Continued)

(58) Field of Classification Search
None
See application file for complete search history.

(56) References Cited

U.S. PATENT DOCUMENTS

2003/0078156 A1 4/2003 Lowden et al.
2004/0145308 A1* 7/2004 Rossner ............. C09K 11/7774
313/512
(Continued)

FOREIGN PATENT DOCUMENTS

CN 1880402 A 12/2006
DE 10349038 A1 5/2004
(Continued)

OTHER PUBLICATIONS

Kochawattana, S.; Chapter 4 of "Phase Formation and Sintering of YAG Ceramics", 2007, Thesis presented at Pennsylvania State University, p. 70-100.*
(Continued)

*Primary Examiner* — Mark Ruthkosky
*Assistant Examiner* — Julia L Rummel
(74) *Attorney, Agent, or Firm* — Ruggiero McAllister & McMahon LLC

(57) ABSTRACT

A strongly scattering optoceramic converter material having a density of less than 97% is provided, as well as a method for producing such an optoceramic material. By appropriately choosing in particular the composition, blending method, and sintering conditions, the production method permits to produce converter materials with tailored properties.

10 Claims, 6 Drawing Sheets

(51) Int. Cl.
*B28B 17/00* (2006.01)
*C04B 35/626* (2006.01)
*C04B 35/64* (2006.01)
*C09K 11/77* (2006.01)
*C04B 35/01* (2006.01)

(52) U.S. Cl.
CPC ............ *C04B 2235/3224* (2013.01); *C04B 2235/3225* (2013.01); *C04B 2235/3229* (2013.01); *C04B 2235/3286* (2013.01); *C04B 2235/3418* (2013.01); *C04B 2235/5445* (2013.01); *C04B 2235/5454* (2013.01); *C04B 2235/604* (2013.01); *C04B 2235/764* (2013.01); *C04B 2235/77* (2013.01); *C04B 2235/81* (2013.01); *C04B 2235/9653* (2013.01); *Y10T 428/249953* (2015.04)

(56) References Cited

U.S. PATENT DOCUMENTS

| | | | |
|---|---|---|---|
| 2005/0092408 A1 | 5/2005 | Lauf et al. | |
| 2008/0191608 A1* | 8/2008 | Schmidt | C09K 11/0883 313/503 |
| 2009/0066221 A1 | 3/2009 | Schmidt et al. | |
| 2009/0075810 A1* | 3/2009 | Hayashi | G02B 1/02 501/152 |
| 2010/0067233 A1 | 3/2010 | Bechtel | |
| 2010/0207512 A1 | 8/2010 | Miyagawa et al. | |
| 2010/0276717 A1* | 11/2010 | Boerkekamp | C04B 35/44 257/98 |
| 2010/0301739 A1* | 12/2010 | Nakamura | B82Y 30/00 313/503 |
| 2011/0014428 A1 | 1/2011 | Nakamura | |
| 2011/0116263 A1* | 5/2011 | Cillessen | B32B 18/00 362/235 |
| 2013/0125982 A1* | 5/2013 | Oguri | H01L 31/0322 136/258 |

FOREIGN PATENT DOCUMENTS

| | | | |
|---|---|---|---|
| JP | 2009530788 | 8/2009 | |
| JP | 2009530839 | 8/2009 | |
| JP | 2010024278 | 2/2010 | |
| JP | 2010509751 | 3/2010 | |
| JP | 2011510487 | 3/2011 | |
| JP | WO 2012014924 A1 * | 2/2012 | ......... H01L 31/0322 |
| JP | 2012064484 | 3/2012 | |
| WO | 2007107917 A2 | 9/2007 | |
| WO | 2008012712 A1 | 1/2008 | |
| WO | 2009119826 | 1/2009 | |
| WO | 2009090580 A1 | 7/2009 | |
| WO | 2011094404 A1 | 8/2011 | |

OTHER PUBLICATIONS

International Search Report dated Mar. 25, 2014 for corresponding PCT/EP2014/050053 with English translation, 8 pages.
International Preliminary Report on Patentability dated Apr. 23, 2015 for corresponding PCT/EP2014/050053 with English translation, 35 pages.
English translation of relevant sections of KLEIN, "Farbenphysik für industrielle Anwendungen" (Color Physics for Industrial Applications), Springer, Berlin 2004, 3 pages.
English translation of formula 5.2.9. in G.A. Klein, "Farbenphysik für industrielle Anwendungen" (Color physics for Industrial Applications), Springer, Berlin 2004.

* cited by examiner

STRONGLY SCATTERING CERAMIC CONVERTER AND METHOD FOR PRODUCING SAME

CROSS REFERENCE TO RELATED APPLICATIONS

This application is a continuation of International Application No. PCT/EP2014/050053 filed on Jan. 3, 2014 claims benefit under 35 U.S.C. § 119(a) of German Patent Application No. DE 10 2013 100 832.1 filed Jan. 28, 2013, the entire contents of all of which are incorporated herein by reference.

BACKGROUND OF THE INVENTION

1. Field of the Invention

The invention relates to strongly scattering optoceramic converter materials, to the use of the converters according to the invention in optoelectronic devices in remission, and to a production method for providing the converters of the invention.

2. Description of Related Art

Converter materials are used in optoelectronic devices such as LEDs. In this case, the converter material converts irradiated excitation light having a first wavelength (also referred to as blue excitation light below) at least partially to emit light having a second wavelength. Because of their advantageous physical properties, ceramic converter materials are increasingly employed for this purpose.

Mostly, the ceramic converter materials are used in a converter having a transmission configuration. In transmission converters, the blue excitation light is incident on one side of the converter material, and the light exiting from the converter on the other side is exploited.

In order to produce a white color impression with a transmission converter, the emitted light has to be mixed with a portion of blue excitation light. The proportion of the admixed blue excitation light depends on the wavelength of the emitted converted light and of the color location to be obtained.

And, the portion of admixed blue excitation light should have a similar spatial radiation behavior as the converted light. This is achieved in that the blue light is scattered by the ceramic converter material.

In the prior art, the scattering of the blue excitation light is disclosed to be achieved either by incorporating second phases or by incorporating pores as scattering centers in the ceramic converter.

However, the scattering must not result in a significant remission of the blue excitation light, since a remitted proportion of blue excitation light does not contribute to the useful luminous flux and thus reduces the efficiency of the converter. Therefore, accurate control of the porosity and pore sizes in the converter material is unavoidable.

Patent application publication US 2009/0066221 A1, for example, describes a ceramic conversion element in which the blue excitation light is scattered at pores and in which the density of the converter is at least 97%. The porosity is caused by incomplete sintering of the green body in this case. Pore diameter is between 250 nm and 2900 nm and is primarily determined by the grain size of the reactants used.

WO 2011/094404 describes a porous ceramic having substantially spherical pores. The pores have diameters in a range from 500 nm to 10 micrometers. Here, control of porosity is accomplished by adding spherical particles such as PMMA particles or PE particles as pore-forming additives. During subsequent sintering the additives are burned away.

Generally in converters, the converted light is initially emitted isotropically in all directions. In the transmission configuration only the light in the direction of transmission is exploited. The remitted light is lost or has to be "recycled" by reflectors or coatings. An alternative to a transmission converter configuration is to operate the converter in remission.

In converters operated in remission, input of the blue excitation light and exit of the emitted useful light occur on the same side of the converter. Therefore in this case, high remission of the converter is advantageous.

Accordingly, the requirements on ceramic conversion materials for remission applications are significantly different from the requirements on the converter materials for an application in transmission.

Therefore, the converter materials known from prior art are not suitable for use in remission converters.

SUMMARY

Therefore, an object of the invention is to provide ceramic converter materials which have optimal optical and mechanical properties for use in remission converters. Furthermore, it is an object of the invention to provide a method for producing the corresponding converter materials, which allows to obtain ceramic converter materials with tailored optical properties.

This object is achieved in a surprisingly simple way by the subject matter of the present application.

The optoceramic of the invention, also referred to as converter material below, is suitable for at least partially converting excitation light having a first wavelength into emitted light having a second wavelength. In particular, the optoceramic of the invention is suitable for converting excitation light into emitted light in remission.

Thus, the optoceramic of the invention is a strongly scattering converter material which at the same time, however, has a high quantum efficiency.

This is achieved by the unique composition and morphology of the converter material.

The conversion material is a porous optoceramic with only a single optoceramic phase. The ceramic phase is provided as a single phase or at least substantially single phase. Here the term "single phase" in the sense of the invention only refers to the ceramic fraction of the converter material, that means the pores existing in the converter material are not considered as a second ceramic phase within the meaning of the invention. Furthermore, the term "single-phase ceramic phase" in the meaning of the invention does not exclude that other ceramic phases exist to a minor extent, such as for example caused by process-related deviations in weighing within a deviation error. Also, grinding ball abrasion may be taken into account in weighing, for example.

Any traces of a second ceramic phase, for example caused by incomplete conversion of the raw materials, are process-related and not intended.

The low density of the converter material is a result of its porosity. The pores in the optoceramic cause strong light scattering, which is only referred to as scattering below. For converter materials that are used in remission converters, strong scattering is advantageous. The densities specified are geometrically determined densities.

This applies to applications in which white light is to be produced, as well as to applications in which a color channel is to be obtained the most spectrally pure possible.

For generating white light, scattering has to be so strong that a portion of the blue excitation light is not absorbed by the converter but is remitted and combines with the emitted converted light.

For remission applications in which a color channel as spectrally pure as possible is to be achieved, such as for projectors, it is crucial that only the emission spectrum of the converter material is produced. In this case, a most complete absorption possible of the blue excitation light increases the efficiency of the converter. Therefore, the scattering responsible for the remission of the blue light must not be too strong in relation to the absorption of the blue light. However, this relation should rather be adjusted through stronger blue absorption than through weaker scattering, if possible, because strong scattering is advantageous in this application as well: Scattering has an advantageous influence on the spatial distribution of the emitted converted light on the surface of the converter. In this manner it can be achieved that the extent of the converted light on the surface of the converter is not or only slightly larger than the corresponding extent of the blue excitation light. This localization of the light spot can be achieved by high scattering of the converter material and results in a homogeneous color impression across the entire converter.

Thus, the converter material comprises a ceramic phase of the composition $A_3B_5O_{12}$ with A=Y, Gd, Lu, and combinations thereof, and B=Al, Ga, and combinations thereof.

Through the composition of the optoceramic the wavelength range of the emitted light can be adjusted selectively. Preferably, the optoceramic phase is an activated $Y_3Al_5O_{12}$ phase or a $Lu_3Al_5O_{12}$ phase. According to one embodiment of the invention, the optoceramic phase is a $(Gd,Y)_3Al_5O_{12}$ phase or a $(Y,Lu)_3Al_5O_{12}$ phase. Furthermore preferably, the optoceramic phase is a $Lu_3(Al,Ga)_5O_{12}$ phase.

Furthermore, the ceramic phase contains cerium as an activating element. Preferably the optoceramic comprises cerium as an active element. The cerium content is specified by the content of $CeO_2$ in percent by weight of the total initial weight of the reactants and preferably ranges from 0.001 to 3 wt %, more preferably from 0.05 to 0.25 wt. %. Here, the active element is stoichiometrically calculated to the A site in the crystal system. According to a particularly advantageous embodiment of the invention, the cerium content is from 0.003 to 0.3 wt %. Optoceramics with such cerium contents exhibit a particularly advantageous ratio of scattering length to absorption length.

According to a refinement of the invention it is suggested to use at least one further activating element. Through the type and concentration of the active element, the ratio of scattering length to absorption length can be adjusted. This ratio is the deciding factor of how much of the blue excitation light is remitted. Thus, the color location of the converter can be adjusted through the type and concentration of the active element. Preferably, as a further activating element the optoceramic comprises an element from the group consisting of elements terbium, praseodymium, samarium, and combinations thereof.

According to one embodiment of the invention, the optoceramic includes gadolinium as a second element A. In particular, the $Gd_2O_3$ content of the optoceramic is from 0.5 to 8 mol % as calculated to the A site, preferably from 1 to 4 mol %, and more preferably from 1.5 to 3.5 mol %. Gadolinium is preferably used in combination with yttrium as the element A. Most preferably, gadolinium is used in an yttrium aluminum garnet.

According to another embodiment of the invention, the optoceramic includes gallium as a second element B. In particular, the $Ga_2O_3$ content of the optoceramic is from 0.5 to 15 mol % as calculated to the B site, preferably from 1 to 10 mol %, and more preferably from 1.5 to 7 mol %. Preferably, gallium is used in combination with lutetium as the element B.

In one embodiment, a Lu content from 25 to 30 mol % of Lu is preferably used. This is particularly advantageous for applications in which green light is to be generated. According to another embodiment of the invention, the lutetium content is from 0.5 to 7 mol %. This proportion is particularly advantageous for converters which should exhibit increased temperature stability.

The converter material according to the invention thus advantageously permits to adjust the color location through its density or porosity, composition of the optoceramic phase and concentration and selection of the activator contained therein, depending on the respective requirements.

According to one embodiment of the invention, the scattering is adjusted via the parameters mentioned above so that a portion of the blue excitation light is not absorbed by the converter but is remitted and combines with the emitted light. This is particularly important in applications in which a color location as close to white as possible is to be generated in remission.

From the prior art, optoceramics are known in which scattering is realized by incorporating secondary phases. The converter material according to the invention, by contrast, only includes one ceramic phase. In particular, the ceramics of the invention are at least largely free of primary particles. According to one embodiment, the content of free $A_2O_3$ and/or $B_2O_3$ particles in an $A_3B_5O_{12}$ ceramic, i.e. particles not integrated in the sintered ceramic phase, is less than 5 vol %, more preferably less than 2.5 vol %, most preferably less than 1.5 vol % (as determined by SEM images).

This is particularly advantageous because the ceramics of the invention may therefore be excited with high power densities, for example by a laser. By contrast, in ceramics including $Al_2O_3$ in form of agglomerated primary particles as a second phase, for example, there is a risk that these particles heat up which can lead to cracking in the ceramic.

According to an advantageous embodiment, the average pore size is from 0.1 to 100 µm, preferably from 0.5 to 50 µm and more preferably from 3 to 5 µm. The particle sizes were determined on the basis of SEM images (maximum and minimum Martin's diameter). In particular, the pores have a polygonal or at least predominantly polygonal shape. Due to their polygonal shape, the pores resemble to a facet. It can therefore be assumed that due to this shape the individual pores together cause a kind of "cat's eye effect" thus contributing to the strong scattering of the converter material.

In an advantageous refinement of the invention, the optoceramic includes a further active element. Optoceramics according to this refinement in particular comprise at least one element selected from the group of the elements Pr, Sm, Tb.

The high scattering of the converter is accompanied by a reduced density of the optoceramic. According to one embodiment of the invention, a ceramic converter of 1 mm thickness exhibits a remission at 600 nm from 0.7 to 1, preferably from 0.75 to 0.95.

The remission was measured in a spectrophotometer with an integrating sphere, with the sample slightly tilted, i.e. including Fresnel reflection. Sample thickness was always 1 mm in order to ensure comparability of the measured data. For a passive scatterer of a given thickness d, remission is a monotonically increasing function of scattering length S. The relationship can be modeled, for example, by the Kubelka-Munk theory according to which the following applies: $R=1/(a(S)+b(S))*\cot h(k(S)*d)$.

(See, e.g., formula 5.2.9. in G. A. Klein, "Farbenphysik für industrielle Anwendungen" (Color physics for Industrial Applications), Springer, Berlin 2004). Thus, remission is a suitable measure for the scattering behavior of a converter and is easily determined. Scattering has to be evaluated on passive material, that means outside of the excitation spectrum, but preferably within the emission spectrum. The choice of evaluation wavelength 600 nm satisfies this condition. The greater the scattering, the more the material remits at 600 nm.

Preferably, the optoceramic has a density from 90 to 96.5%, more preferably from 93 to 96.5%. In particular optoceramics having densities as specified above exhibit high scattering and at the same time high mechanical stability. This is advantageous since so the processability even of rather thin optoceramics is ensured. For example, some applications use converters having a dielectric coating and a thickness of 200 micrometers, and in such converters the converter material has to be sufficiently stable for the necessary sawing, grinding and polishing processes.

In an advantageous embodiment of the invention, the optoceramic has a thickness from 100 to 300 micrometers, in particular from 150 to 250 μm. The small thickness of the optoceramics has an advantageous effect on the localization of the light spot. Also, the small thickness of the converter material permits efficient cooling. This, in turn, has an advantageous effect on the efficiency of the converter. That is, in a thin converter the thermal energy mainly introduced by Stokes losses can be dissipated more efficiently and with a lower thermal resistance than this would be possible with a thicker converter.

Preferably, the optoceramics exhibit a quantum efficiency of greater than 85%, more preferably greater than 95%.

The quantum efficiency of the converter is given by the ratio of the number of emitted converted photons to the number of exciting blue photons. The values specified above refer to quantum efficiencies as measured with a quantum efficiency measuring system Hamamatsu C9920. The measurement was performed on converters placed in an integrating sphere and excited with blue excitation light of known power and wavelength. From the emission spectrum normalized to the excitation power, quantum efficiency can be calculated. In addition, the percentage remission at the wavelength of the blue excitation light including the Fresnel reflection as well as the color location of the converter are calculated from the emission spectrum. It should be noted here that the so measured color location does not necessarily correspond to the color location of a light source built with this converter, because application-specific parameters such as rear mirror, accounting for Fresnel reflection, and converter thickness have an influence thereon.

The optoceramics according to the invention are therefore suitable for use as a converter material in remission converters. By virtue of their thermal stability and thermal conductivity, optoceramics may in particular be used in remission converters in which excitation is accomplished using laser light of high power density, for example with excitation using a laser diode.

The method according to the invention for producing a single-phase ceramic converter material having a density of less than 97% and comprising a ceramic phase of a composition $A_3B_5O_{12}$ doped with cerium as a first activator, with A selected from a group consisting of elements Y, Gd, Lu, and combinations thereof, and B selected from a group consisting of elements Al, Ga, and combinations thereof, comprises at least the following method steps a) to j):

In step a) the raw materials are weighed in oxide form, as $A_2O_3$, $B_2O_3$, and $CeO_2$, in proportions according to the target composition. The target composition may vary around the stoichiometric range of the garnet composition, in particular by 0.001 to 2.5 mol % toward the side richer in $A_2O_3$, or by 0.001 to 2.5 mol % toward the side richer in $B_2O_3$, without departing from the scope of the invention. Preferably, the deviation of the target composition from the stoichiometric range of the garnet composition toward the $A_2O_3$-richer side or $B_2O_3$-richer side is less than 1.5 mol %, more preferably less than 1 mol %.

The primary particles of the starting materials have an average particle size smaller than 1 micrometer. Preferably, particle sizes of the starting raw materials are <750 nm, more preferably <300 nm.

Average particle size was determined by evaluation of corresponding REM images. One embodiment of the invention uses primary particles having a size from 20 to 300 nm, preferably from 30 to 60 nm.

According to one embodiment, $Y_2O_3$ and $Al_2O_3$ are used as main components in step a). In another embodiment, $Lu_2O_3$ and $Al_2O_3$ are used as the main components.

In a refinement of the invention, $Gd_2O_3$ is additionally used in step a), with a proportion of $Gd_2O_2$ from 0.5 to 20 wt %, preferably from 1 to 15 wt %, and more preferably from 2.5 to 10 wt %.

According to one embodiment of the invention, a $CeO_2$ content from 0.01 to 3 wt % is suggested, preferably from 0.1 to 0.2 wt %, and more preferably from 0.03 to 0.2 wt %.

Additionally, dispersing agents, binding agents, and/or compressing adjuvants may be added to the mixture in step a).

In step b), a suspension is prepared by slurrying the starting materials in a suitable liquid, which suspension is subjected to a first homogenization step in subsequent step c).

In the first homogenization step c), agglomerates of the starting materials are crushed and homogenized by wet milling using grinding media. Grinding media preferably used is of $Al_2O_3$ or according to the composition of the main phase of the ceramic to be obtained.

After the first homogenization step c) the suspension is allowed to stand in step d). In step e), further homogenization is accomplished in a second homogenization step. Subsequently, in step f), the grinding media is removed from the suspension and the suspension is dried. This may be accomplished, for example, by removing the liquid using a rotary evaporator, by spray drying, or by granulation.

In step g), the dried mixture is uniaxially compressed at a pressure from 10 to 50 MPa to produce a green body, which is compacted in step h) by being isostatically compressed at a pressure from 100 to 300 MPa.

In step i), binding agents are removed from the green body, preferably at temperatures in a range from 600 to 1000° C. The brown body so obtained is sintered in step j) at a temperature in a range from 1550 to 1800° C.

The production method according to the invention permits to provide converter materials with tailored properties, in particular for use in remission converters.

For example density, homogeneity, and porosity of the optoceramic can be selectively adjusted through parameters of the composition, in particular the concentration of the active elements, of the blending method, and of the sintering temperature.

The blending method comprising steps c) to e) contemplates at least two homogenization steps, and between the homogenization steps the suspension is left to stand to allow the particles to precipitate. The term "left to stand" in the sense of the invention particularly refers to the fact that no convection occurs.

In the first homogenization step (method step c)) the agglomerated primary particles are comminuted by wet milling using grinding media, and the suspension is homogenized.

In particular, homogenization is effected by uniaxially moving the suspension containing the grinding media. Preferably, for this purpose, a roller bench is used in step c). In one embodiment, milling duration is from 12 to 16 hours. This is particularly advantageous, since with shorter milling durations sufficient comminution and homogenization cannot be ensured. Excessive milling durations, on the other hand, may increase abrasion of the grinding media and may thus cause contamination of the suspension to be homogenized.

After the first homogenization step in step c), the suspension is preferably left standing for a duration from 3 to 20 hours, preferably for a duration from 5 to 12 hours. This is particularly advantageous if a dispersing agent was added in step a). Particularly preferred is a dispersing agent based on a polymer having ester groups.

Due to the first homogenization step the primary particles already exist in a sufficiently comminuted and homogeneously distributed form in the suspension, so that in step c) the dispersing agent may act even without further convection. Thus, the total grinding duration can be reduced, and therefore abrasion of the grinding media as well.

Subsequently, a second homogenization step is performed in step d). Preferably, in step d), homogenization is effected by a multi-axial movement of the milled material and the grinding media. According to an advantageous embodiment of the invention, the second homogenization step is performed using a tumbler. Milling duration in step d) is preferably between 12 and 24 hours.

During the second homogenization step, the agglomerates that have already been crushed in the first homogenization step are further deagglomerated particularly effectively, so that a high homogeneity of the suspension is achieved. This effect is pronounced particularly beneficially when the suspension with the grinding media is subjected to a multi-axial movement in the second homogenizing step. Moreover, a dispersing agent was activated by method step c) described above and could already act on the particles, whereby the homogeneity of the suspension can be further enhanced in the second homogenization step.

Thus, the blending method employed results in a very homogeneous distribution of the particles in the suspension and therefore in the sintered ceramic as well. Moreover, clustering is avoided by the blending method, for example. This is particularly advantageous since in this manner rather large grains are avoided, for example, which might not completely react under the sintering conditions of the invention and could therefore lead to a phase formation in the optoceramic.

According to a refinement of the invention, a sintering aid is added in step d), in particular a sintering aid based on $SiO_2$, with a proportion of the sintering aid of less than 0.2 wt % (calculated as $SiO_2$). This low percentage of sintering aids is particularly advantageous because it has a beneficial impact on the transparency of the sintered optoceramic. This low percentage of sintering aids is in particular made possible by the homogeneous distribution of the starting materials and thus by the blending method of the invention. According to an advantageous embodiment of the invention, it is even suggested to perform sintering without using a sintering aid.

According to one embodiment of the invention, the content of dispersing agents is from 0.1 to 3 wt %, preferably from 0.1 to 1 wt %, more preferably from 0.1 to 0.6 wt %.

According to one embodiment of the invention, the content of binding agent is from 0.1 to 3 wt %, preferably from 0.1 to 1 wt %, more preferably from 0.1 to 0.6 wt %.

In step i), the green body is preferably subjected to a thermal treatment at temperatures of up to 700° C., in particular under a flowing atmosphere. In particular due to the low carbon content of the green body, for example caused by a small content of binding agent, debinding may be accomplished at rather low temperatures, which is moreover advantageous from an economic point of view. By using a flowing atmosphere, debinding can be accelerated.

Once the green body has been formed and binding agents have been removed, reactive sintering of the brown body is performed in step j). Sintering temperature is in a range from 1550 to 1800° C. According to one embodiment of the invention, sintering duration is from 2 to 24 hours, preferably from 2 to 13 hours, and more preferably from 2 to 7 hours.

According to an advantageous embodiment of the invention, sintering is performed under an oxygen-containing atmosphere, preferably under an atmosphere comprising air enriched with oxygen. By using an oxygen-containing atmosphere, a subsequent re-oxidizing step following the sintering can be dispensed with, in contrast to sintering performed in a reductive atmosphere, for example.

In conjunction with the blending method described above, the optoceramic can be selectively adjusted in terms of density and porosity through the sintering conditions. Thus, the optoceramics produced by the method according to the invention exhibit high transparency and high quantum efficiency, despite of the comparatively low sintering temperatures. Furthermore, the optoceramics produced accordingly exhibit high homogeneity in terms of number of pores and pore shape.

In this way, the addition of a pore-forming additive, such as the addition of polymer particles can be dispensed with, for example. This is particularly advantageous since in this manner less carbon-containing material is introduced into the mixture, which has to be removed in a time-consuming process during debinding. Even pre-sintering for removal of carbon can be dispensed with. The carbon content of an optoceramic that is used as a converter should be as low as possible, since it has an adverse effect on the quantum efficiency of the converter.

Moreover, since in the production method according to the invention pore formation is determined by the sintering temperature and sintering duration, the pores are forming at the triple points of the grains during the sintering process, i.e. at the contact point of three crystallites that form a dihedral angle of 120°. The homogeneous particle distribution and grain size achieved by the blending method allows to obtain optoceramics having homogeneously distributed polygonal pores.

The invention will now be described in more detail by way of figures, general production procedures and exemplary embodiments.

DETAILED DESCRIPTION

Figure 1:
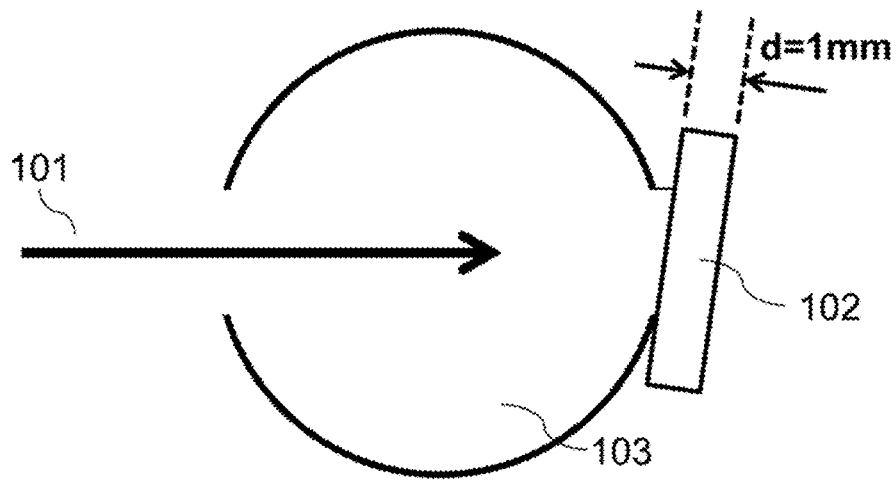
FIG. 1 shows the measurement setup for measuring remission at 600 nm for evaluation of scattering.

FIG. 1 shows the measurement setup for measuring remission at 600 nm for evaluating scattering.

The measurement was performed in a spectrophotometer with integrating sphere, for example in a Lambda 950 from manufacturer Perkin Elmer. Light from a grating monochromator 101 is incident on the sample 102 to be measured. The sample is slightly tilted, which means it is measured including the Fresnel reflection. The sample has a thickness of 1 mm. This value has been chosen arbitrarily, but must always be the same, for comparability of the measurements. The light remitted from the sample is measured by means of the integrating sphere 103. By referring to a previously measured remission standard, the absolute remission of the sample can be measured. For a passive scatterer of a given thickness d, remission is a monotonically increasing function of scattering length S and is therefore an appropriate measure for the scattering behavior of the ceramic converter.

Figure 2:
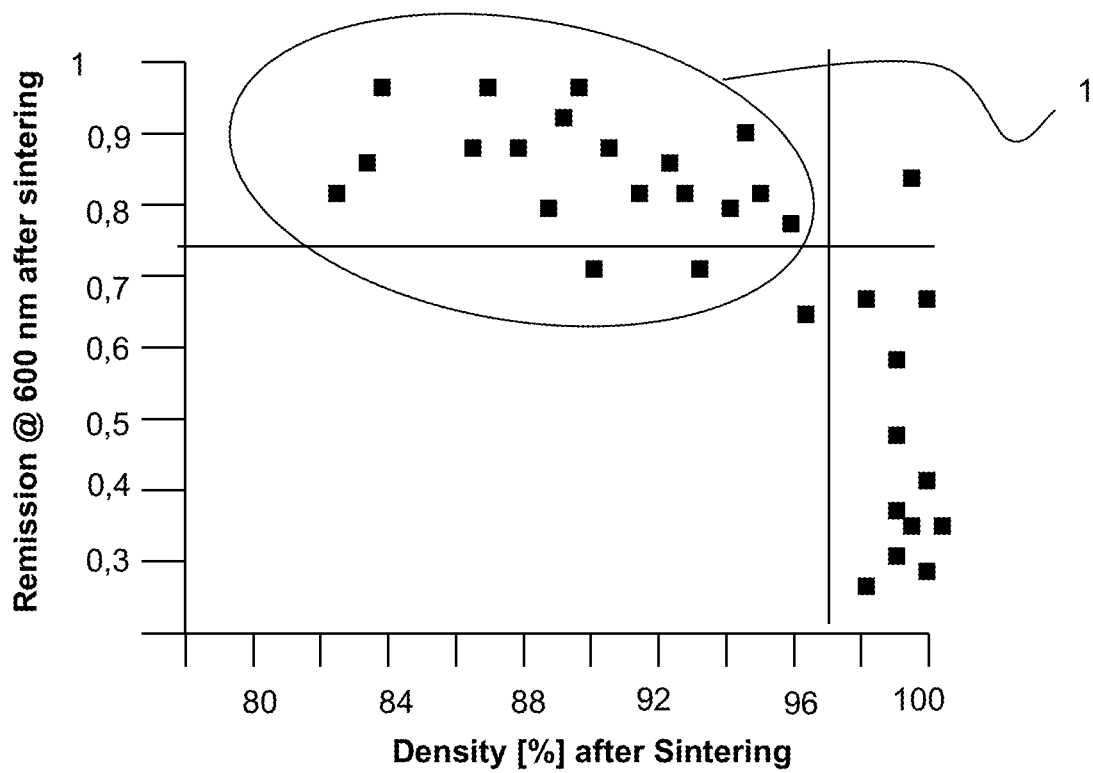
FIG. 2 illustrates the relationship between remission at 600 nm and density.

FIG. 2 shows the relationship between the density of a sintered optoceramic and its remission at 600 nm.

The density was determined by geometrical measurement and weighing of the sintered samples. Typical sample geometries are cylinders having a diameter of 15 mm and a height of about 10 mm, but the density may be determined on samples of other geometries and sizes as well. The density values are based on the theoretical density.

FIG. 2 shows that a low density generally results in high remission. In particular at densities of greater than 97%, remission drops steeply. The range 1 according to the invention, by contrast, is distinguished by high remission.

Furthermore, FIG. 2 shows that ceramics having the same or very similar densities may exhibit different remission values. This illustrates that the remission of optoceramics according to the invention may be influenced not only by the density, but by further parameters such as the composition and activator content.

Figure 3:
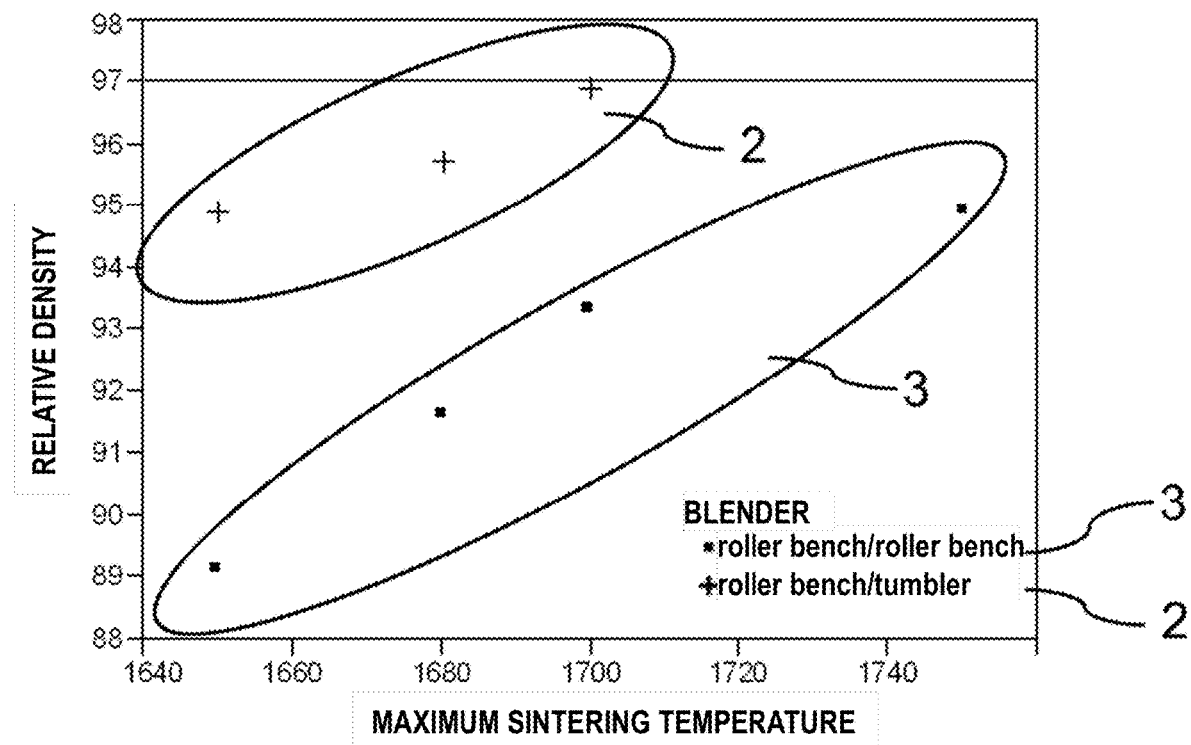
FIG. 3 illustrates the influence of the blending method and the sintering temperature on the density of the optoceramic.

FIG. 3 illustrates that in addition to the selected sintering temperature the density of the optoceramic depends on the blending method.

Important production parameters of the converters illustrated in FIG. 3 are summarized in Table 1.

TABLE 1

| Sample | Application | Material System | $Ce_2O_3$ [wt %] | Maximum Sintering Temperature [° C.] | Blender |
| --- | --- | --- | --- | --- | --- |
| 2a | white light | YAG | 0.1 | 1650 | roller bench/tumbler |
| 2b | white light | YAG | 0.1 | 1680 | roller bench/tumbler |
| 2c | white light | YAG | 0.1 | 1700 | roller bench/tumbler |
| 3a | white light | YAG | 0.1 | 1650 | roller bench/roller bench |
| 3b | white light | YAG | 0.1 | 1680 | roller bench/roller bench |
| 3c | white light | YAG | 0.1 | 1700 | roller bench/roller bench |
| 3d | white light | YAG | 0.1 | 1750 | roller bench/roller bench |

All measurements were performed on converters of 1 mm thickness in order to guarantee comparability and to ensure that the blue excitation light is completely absorbed in a single passage of the light. By contrast, in applications converters of 200 µm thickness are typically employed, optionally in combination with rear side reflectors.

The optoceramics of the illustrated regime 2 were prepared using an embodiment of the method according to the invention in which in step c) the suspension including the starting materials and grinding media were homogenized in the first homogenization step using a roller bench, i.e. by a single axis movement. The second homogenization step, however, was performed using a tumbler, i.e. by a two axes movement. By contrast, the optoceramics of regime 3 were blended using a roller bench in both the first and the second homogenization steps.

FIG. 3 clearly shows the influence of the blending method on the density of the resulting optoceramic. The ceramics of regime 2 have a high density already at low temperatures. The optoceramics of regime 3, on the other hand, have much lower densities with the same sintering temperature. Surprisingly, FIG. 3 shows that the blending method may have a greater influence on the density than the sintering temperature. For example, a sample for which the second homogenization step was performed using a tumbler exhibits a similar density with a sintering temperature of 1650° C. as a sample for which a roller bench was used in both homogenization steps and sintering was performed at a significantly higher sintering temperature of 1750° C.

Figure 4:
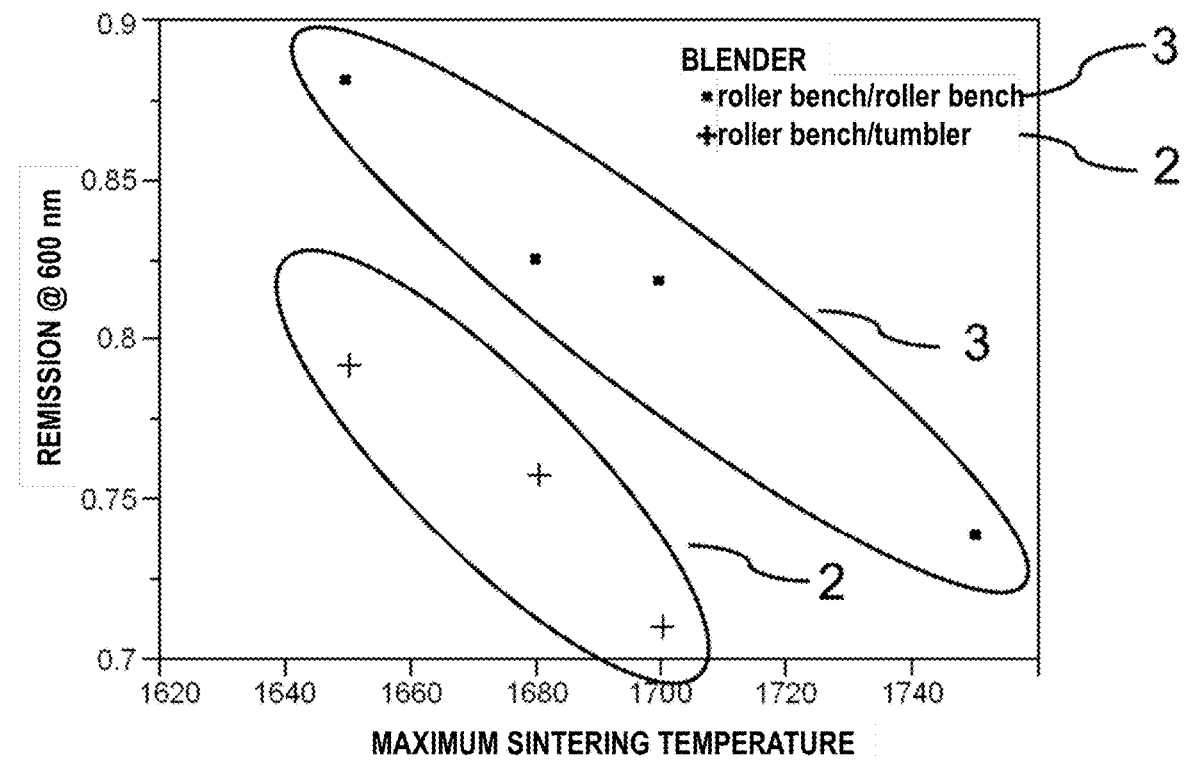
FIG. 4 illustrates the influence of the blending method and the sintering temperature on the remission at 600 nm of an optoceramic of 1 mm thickness.

FIG. 4 shows the relationship between remission at 600 nm and the employed sintering temperature as well as the dependence thereof on the blending method applied. Regimes 2 and 3 are identical to the regimes described with reference to FIG. 3. Here, too, the great influence of the blending method on the remission of the optoceramic is apparent and the significance of the blending method for the optical properties of the optoceramic is demonstrated.

Figure 5:
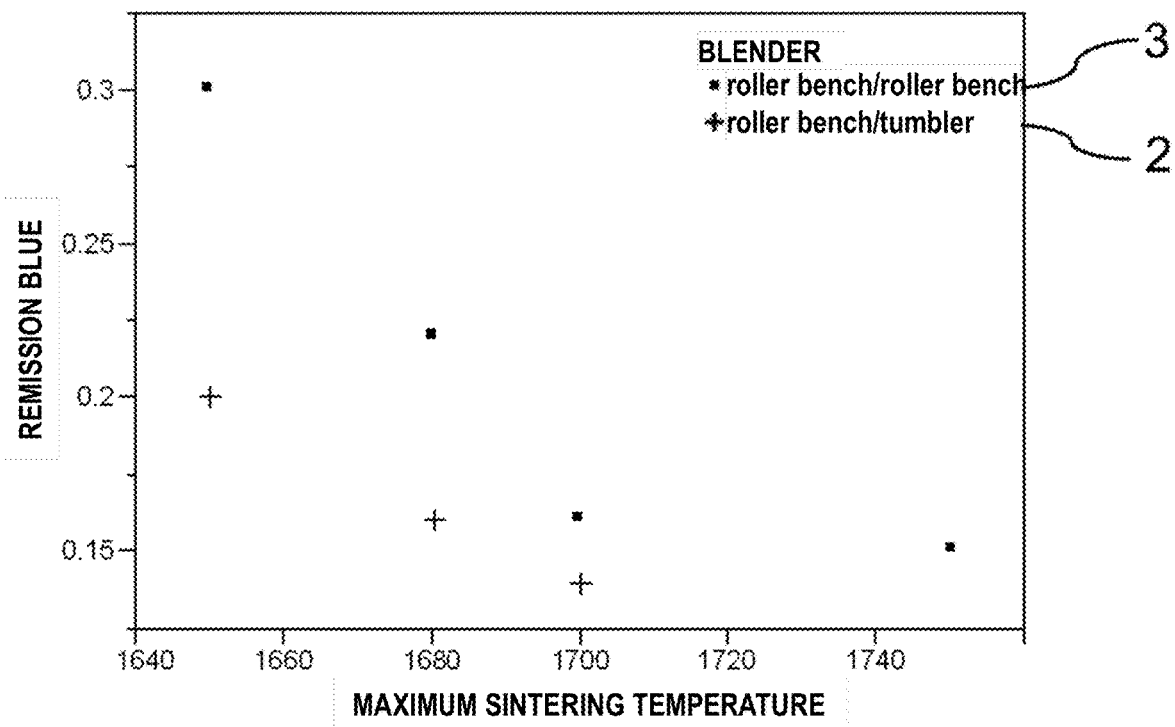
FIG. 5 illustrates the influence of the blending method and the sintering temperature on the remission of the blue excitation light.

FIG. 5 illustrates the influence of the blending method and the sintering temperature on the remission of the blue excitation light.

The remission of blue excitation light is much lower than the remission at 600 nm shown in FIG. 4, since a portion of the blue excitation light is absorbed. Therefore, since the remission of blue excitation light depends on the concentration of the active element, this quantity is not suitable for an absolute evaluation of scattering, however it substantially determines the color location of the light emitted from the converter. For the measurement method selected here, the lower limit for remission is defined by the Fresnel reflection of the converter.

Figure 6:
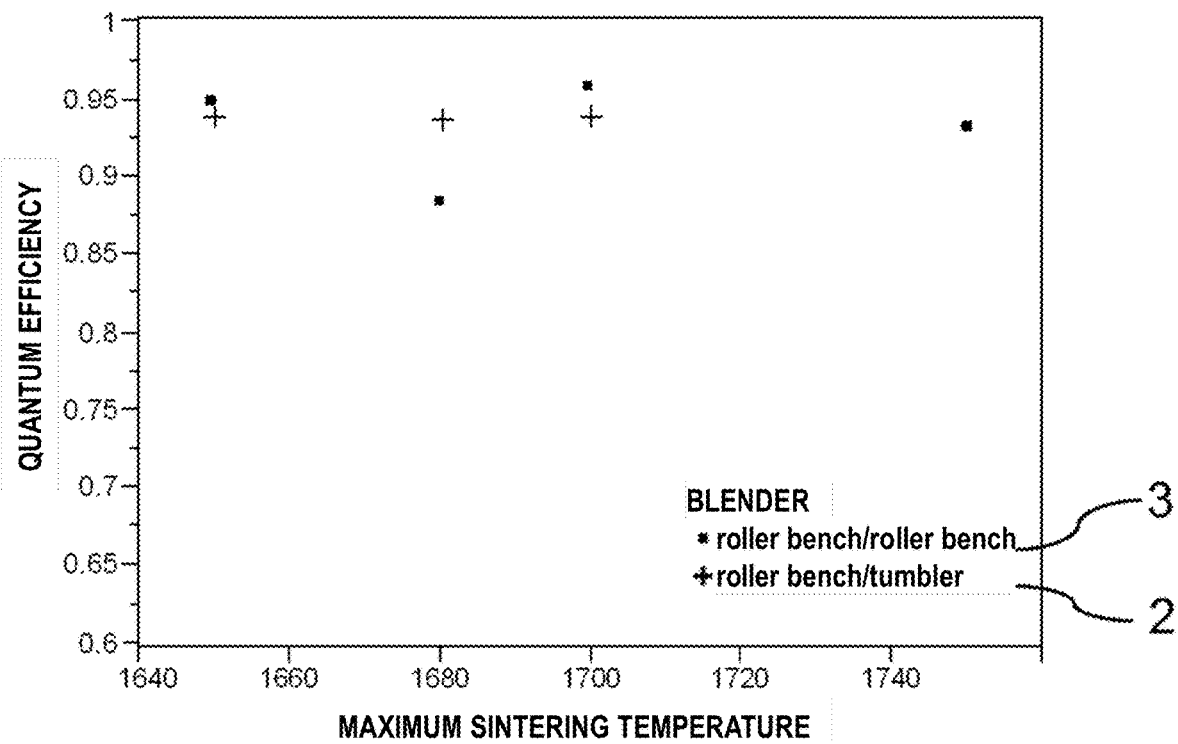
FIG. 6 illustrates the influence of the blending method and the sintering temperature on the quantum efficiency of the converter.

FIG. 6 shows the influence of the blending method and the sintering temperature on the quantum efficiency of the converter.

In the converters according to the invention, surprisingly, the quantum efficiency is substantially independent of the sintering temperature and the blending method. This permits to obtain highly scattering and yet efficient converters.

Figure 7:
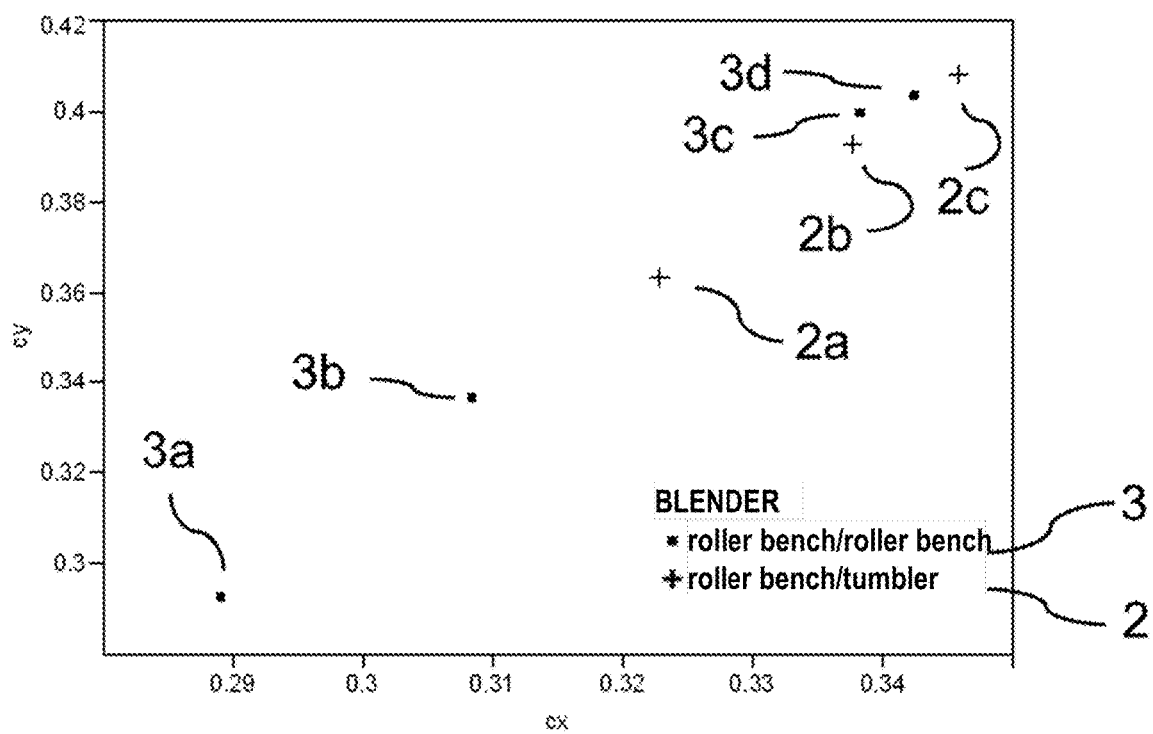
FIG. 7 illustrates the influence of the blending method and the sintering temperature on the color location of the light emitted from the excited converter.

FIG. 7 shows the influence of the blending method and the sintering temperature on the color location of the light emitted from the excited converter.

The color locations of the CIE 1931 color space achievable for a specific converter substantially lie on a line that extends between the color location of the blue excitation light and the color location of the converted light. The position on this line is defined by the mixing ratio of blue and converted light and may therefore be adjusted in the converter of the invention by selecting the sintering temperature and the blending method. The color location was measured using quantum efficiency measuring system Hamamatsu C9920.

Figure 8:
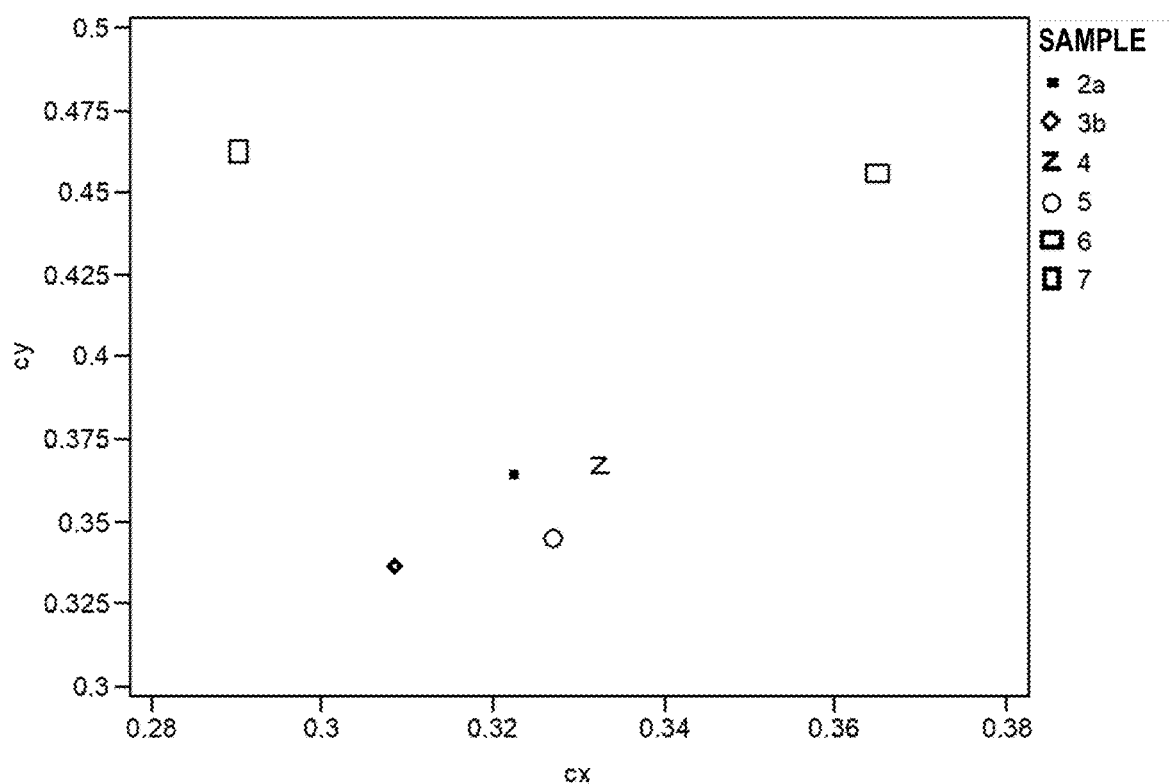
FIG. 8 shows the color location of the converter material as a function of the material system, Ce content, and gadolinium content.

FIG. 8 shows the influence of the sintering temperature and the composition of the optoceramic on the color location. The color location was measured using quantum efficiency measuring system Hamamatsu C9920.

Material system, sintering temperature, gadolinium addition, and further production parameters of samples 2a to 7 of FIG. 8 are listed in Table 2:

carbon by vapor deposition. The breaking surface was observed under a scanning electron microscope. Pores 11 are uniformly distributed across the measured surface of the ceramic. The pores have a homogenous size distribution.

Figure 9:
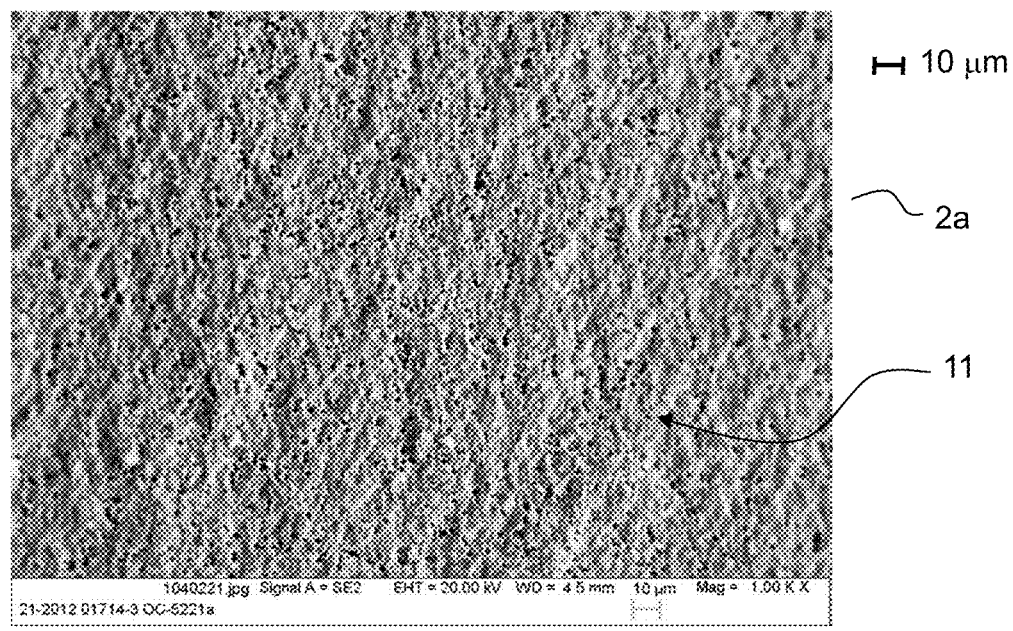
FIG. 9 is an SEM image of a ceramic according to the invention.
Figure 10:
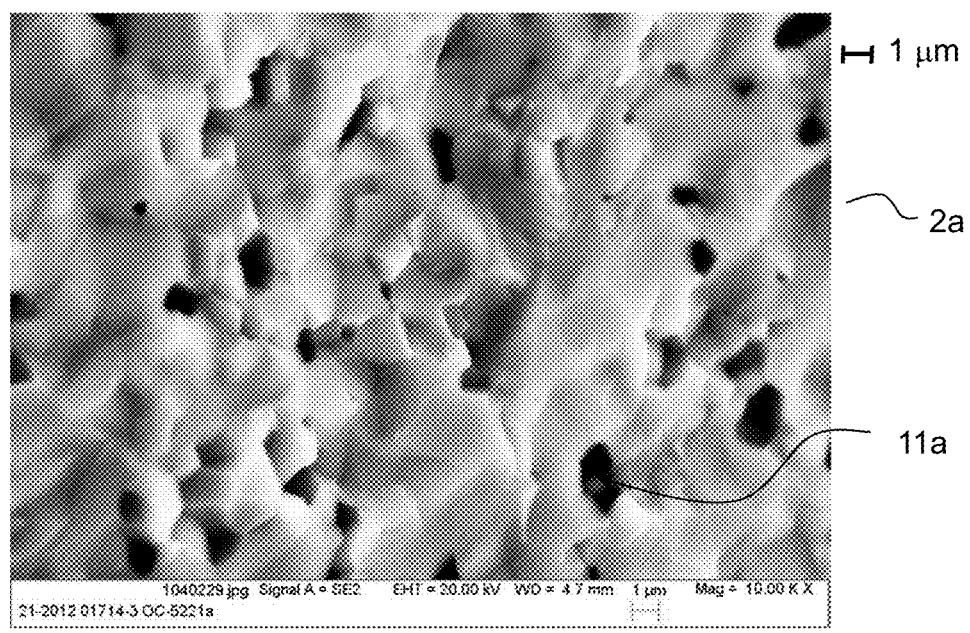
FIG. 10 is an SEM image of the ceramic shown in FIG. 9, with 10× magnification.

FIG. 10 shows the SEM image of the sample illustrated in FIG. 9 with 10× magnification. The polygonal shape of pores 11 is clearly visible.

Figure 11:
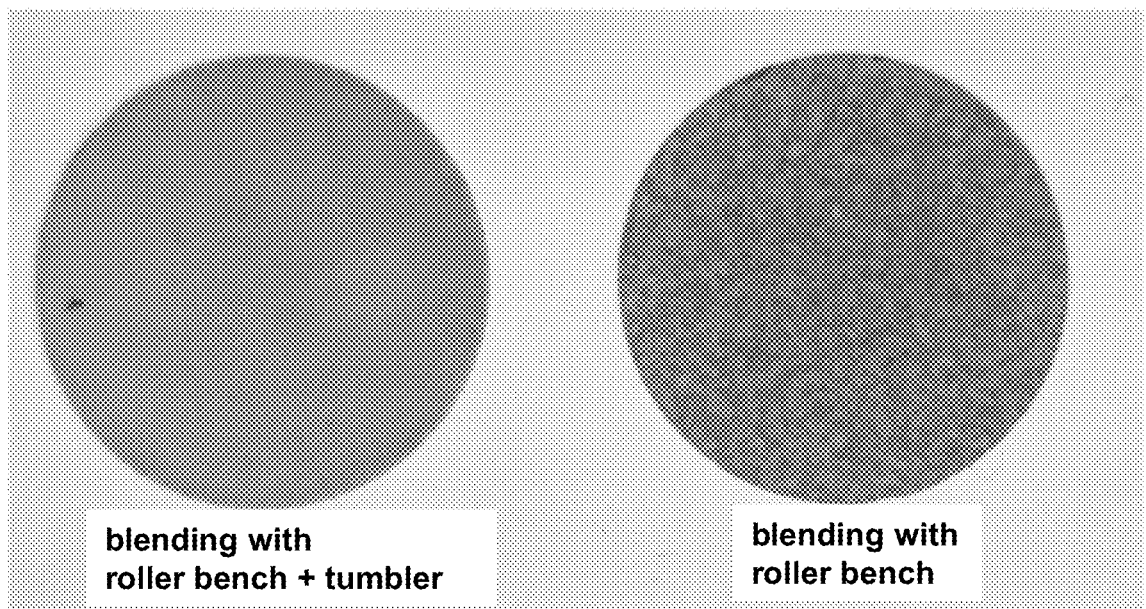
FIG. 11 illustrates the influence of the blending method on the homogeneity of the ceramic converter.

FIG. 11 shows the influence of the blending method on the homogeneity of the ceramic converter. The photograph shows two converter plates, each one with a thickness of 200 µm and with a diameter of 15 mm. The material composition of the converters is identical, and both of them were sintered in the same sintering process. Only the blending method was different. As can be seen, the sample for which the second homogenization step was performed using a tumbler exhibits a significantly better homogeneity.

Figure 12:
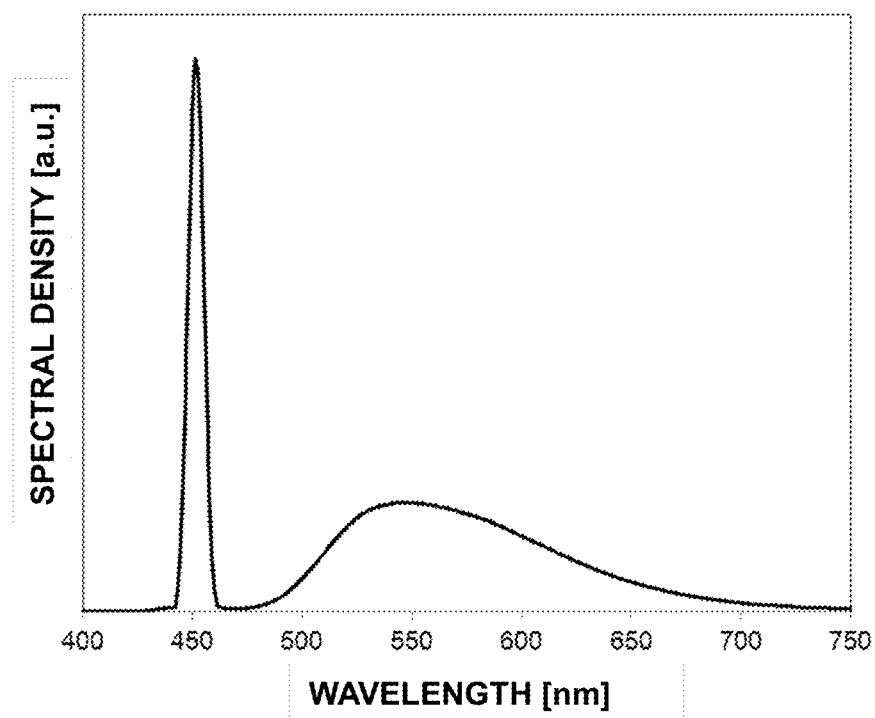
FIG. 12 shows the emission spectrum of a converter for generating white light operated in remission.

FIG. 12 shows the emission spectrum of a converter operated in remission and intended for generating white light.

This spectrum was not acquired using the quantum efficiency measurement system, but from a light source of a configuration comprising a converter of 200 µm thickness bonded to a highly reflective metallic mirror and with the blue excitation light incident on the converter at an angle of 60°. Excitation was effected with an optical power of up to 3 W on a light spot of less than 600 µm diameter.

The spectrum was measured using an integrating sphere located at a distance of 15 cm in the direction of the surface normal of the converter. Therefore, the Fresnel reflection of the excitation light does not contribute to the measured useful light here. The color coordinates of the light source for the 2° observer in the CIE 1931 coordinate system are (cx/cy)=(0.316/0.340). In order to obtain this color impression close to the white point, the power portion of the blue light has to be about 27%. This is made possible by a strongly scattering converter which diffusely remits about 20% of the blue excitation light. The good mechanical properties of the converter material have been proven by the preparation of the converter with 200 µm thickness. The good thermal properties of the converter material have been proven by the exposition of the converter to high power densities without causing damage.

TABLE 2

| Sample | Application | Material System | $Ce_2O_3$ [wt %] | Gd instead of Y [%] | Maximum Sintering Temperature [° C.] | Blender |
|---|---|---|---|---|---|---|
| 2a | white light | YAG | 0.1 | 0 | 1650 | roller bench/tumbler |
| 3b | white light | YAG | 0.1 | 0 | 1680 | roller bench/roller bench |
| 4 | white light - warm | YAG:Gd | 0.1 | 5 | 1630 | roller bench/tumbler |
| 5 | white light - warm | YAG:Gd | 0.1 | 10 | 1630 | roller bench/tumbler |
| 6 | saturated color - yellow | YAG | 0.2 | 0 | 1700 | roller bench/tumbler |
| 7 | saturated color - green | LuAG | 0.1 | 0 | 1700 | roller bench/roller bench |

FIG. 8 illustrates that the color location may be adjusted not only via the material system (LuAG, YAG), but also via the sintering temperature as well as via a variation of the composition (addition of gadolinium in this case).

FIG. 9 shows an SEM image of a sample according to the invention. For taking the SEM image, a breaking edge of the sample was placed in a sample holder and then coated with The preparation of the following groups of materials will now be explained in more detail below.

Example for Producing a Translucent $Y_3Al_5O_{12}$ Ceramic Including $CeO_2$ by Uniaxial Compressing (with Reactive Sintering):

Powders comprising primary particles having diameters of less than 1 µm, preferably diameters <300 nm, of $Al_2O_3$, $Y_2O_3$, and $CeO_2$ are weighed in proportions according to the target composition. The target composition may vary around the stoichiometric range of the garnet composition, i.e. may in particular extend by 0.01 to 2.5 mol % to the $Y_2O_3$-rich side or by 0.01 to 2.5 mol % to the $Al_2O_3$-rich side. The $CeO_2$ is stoichiometrically calculated to the Y site and ranges between 0.01 and 3 wt %. After addition of 0.5 to 3 wt % of dispersing and/or binding agents, the mixture is blended in a ball mill using ethanol and $Al_2O_3$ balls, for 12 to 16 hours. After the mixture was allowed to stand in the milling container for 5 to 12 hours, a second homogenization may be performed in a tumbling blender for 12 to 20 hours. Optionally, TEOS may be added to the mixture before the second blending operation as a sintering aid, so that the equivalent of between 0 and 0.5 wt % of $SiO_2$ is used.

The milled suspension is selectively dried on a rotary evaporator or granulated in a spray dryer.

The powder is then uniaxially compressed into plates or bars. Uniaxial pressure conditions are between 10 and 50 MPa, pressure durations between a few seconds and 1 minute. The preformed green body is compacted in a cold isostatic press at a pressure between 100 and 300 MPa. The pressure transmitting medium is water or oil.

Subsequently, binding agent where required is burned away in a first thermal step. The duration and temperature of the heat treatment are in a range between 1 and 24 hours and temperatures between 600 and 1000° C. The burned green body is then sintered in a chamber furnace under oxygen flow. The sintering temperatures and durations are based on the sintering behavior of the mixture, that means once the composition has been defined, further compression into a ceramic of defined porosity is accomplished. In the case of $Ce:Y_3Al_5O_{12}$ the garnet phase forms above about 1350 to 1450° C. Sintering into a ceramic body is accomplished at higher temperatures, between 1550° C. and 1800° C., for 2 to 24 hours.

In this manner, optically translucent and homogeneous bodies are produced which may be further processed to converter materials.

Example for Producing a Translucent $(Y,Gd)_3Al_5O_{12}$ Ceramic Including $CeO_2$ by Uniaxial Compressing (with Reactive Sintering):

Powders comprising primary particles having diameters of less than 1 μm, preferably of nanoscale size (<300 nm) in diameter, of $Al_2O_3$, $Y_2O_3$, $Gd_2O_3$, and $CeO_2$ are weighed in proportions according to the target composition. The target composition may vary around the stoichiometric range of the garnet composition, i.e. may in particular extend by about 0.01 to 2.5 mol % to the $Y_2O_3$-rich side or by 0.01 to 2.5 mol % to the $Al_2O_3$-rich side. The $Gd_2O_3$ is set off against the $Y_2O_3$ content. The $Gd_2O_3$ content may amount to between 0 and 20% of Gd instead of Y, i.e. from 0 to 20% of the element A may be Gd. The $CeO_2$ is stoichiometrically calculated to the Y site and ranges between 0.01 and 3 wt %. After addition of dispersing and binding agents, the mixture is blended in a ball mill using ethanol and $Al_2O_3$ balls, for 12 to 16 hours. Selectively, a second blending operation is performed in a tumbler for 10 to 24 h. Optionally, TEOS may be added to the mixture before the second blending operation as a sintering aid, so that the equivalent of between 0 and 0.5 wt % of $SiO_2$ is employed.

The milled suspension is selectively dried on a rotary evaporator or granulated in a spray dryer.

The powder is then uniaxially compressed into plates or bars. Uniaxial pressure conditions are between 10 and 50 MPa, pressure durations between a few seconds and 1 minute. The preformed green body is compacted in a cold isostatic press at a pressure between 100 and 300 MPa. The pressure transmitting medium is water or oil.

Subsequently, binding agent where required is burned away in a first thermal step. The duration and temperature of the heat treatment are in a range between 1 and 24 hours and temperatures between 600 and 1000° C. The burned green body is then sintered in a chamber furnace under oxygen flow, or selectively directly in air. The sintering temperatures and durations are based on the sintering behavior of the mixture, that means once the composition has been defined, further compression into a ceramic of defined porosity is accomplished. In the case of $Ce:Y_3Al_5O_{12}$ the garnet phase forms above about 1350 to 1450° C. Sintering into a ceramic body is accomplished at higher temperatures, between 1550° C. and 1800° C., for 2 to 24 hours.

In this manner, optically translucent and homogeneous bodies are produced which may be further processed to converter materials.

Example for Producing a Translucent $Lu_3Al_5O_{12}$ Ceramic by Uniaxial Compressing (with Reactive Sintering):

Powders comprising primary particles having diameters of less than 1 μm, preferably of nanoscale size (<300 nm) in diameter, of $Al_2O_3$, $Lu_2O_3$, and $CeO_2$ are weighed in proportions according to the target composition. The target composition may vary around the stoichiometric range of the garnet composition, i.e. may in particular extend by about 0.01 to 2.5 mol % to the $Lu_2O_3$-rich side or by 0.01 to 2.5 mol % to the $Al_2O_3$-rich side. The $CeO_2$ is stoichiometrically calculated to the Y site and ranges between 0.01 and 3 wt %. After addition of dispersing and binding agents, the mixture is blended in a ball mill using ethanol and $Al_2O_3$ balls, for 12 to 16 hours. Prior to a second blending operation in a tumbler for 10 to 24 h, TEOS may be added to the mixture as a sintering aid, so that the equivalent of between 0 and 0.5 wt % of $SiO_2$ is employed.

The milled suspension is selectively dried on a rotary evaporator or granulated in a spray dryer.

The powder is then uniaxially compressed into plates or bars. Uniaxial pressure conditions are between 10 and 50 MPa, pressure durations between a few seconds and 1 minute. The preformed green body is compacted in a cold isostatic press at a pressure between 100 and 300 MPa. The pressure transmitting medium is water or oil.

Subsequently, binding agent where required is burned away in a first thermal step. The duration and temperature of the heat treatment are in a range between 1 and 24 hours and temperatures between 600 and 1000° C. The burned green body is then sintered in a chamber furnace under oxygen flow, or selectively directly in air. The sintering temperatures and durations are based on the sintering behavior of the mixture, that means once the composition has been defined, further compression into a ceramic of defined porosity is accomplished. In the case of $Ce:Y_3Al_5O_{12}$ the garnet phase forms above about 1350 to 1450° C. Sintering into a ceramic body is accomplished at higher temperatures, between 1550° C. and 1800° C., for 2 to 24 hours.

In this manner, optically translucent and homogeneous bodies are produced which may be further processed to converter materials.

Example for Producing a Translucent $(Y,Lu)_3Al_5O_{12}$ Ceramic Including $CeO_2$ by Uniaxial Compressing (with Reactive Sintering):

Powders comprising primary particles having diameters of less than 1 μm, preferably of nanoscale size (<300 nm) in diameter, of $Al_2O_3$, $Y_2O_3$, $Lu_2O_3$, and $CeO_2$ are weighed in proportions according to target composition. The target composition may vary around the stoichiometric range of the garnet composition, i.e. may in particular extend by about 0.01 to 2.5 mol % to the $Y_2O_3$-rich side or by 0.01 to 2.5 mol % to the $Al_2O_3$-rich side. The $Lu_2O_3$ is set off against the $Y_2O_3$ content. The $Lu_2O_3$ content may amount to between 100% and 50% of Lu instead of Y. The $CeO_2$ is stoichiometrically calculated to the Lu site and ranges between 0.01 and 3 wt %. After addition of dispersing and binding agents, the mixture is blended in a ball mill using ethanol and $Al_2O_3$ balls, for 12 to 16 hours. Selectively, a second blending operation is performed in a tumbler for 10 to 24 h. Optionally, TEOS may be added to the mixture before the second blending operation as a sintering aid, so that the equivalent of between 0 and 0.5 wt % of $SiO_2$ is employed.

The milled suspension is selectively dried on a rotary evaporator or granulated in a spray dryer.

The powder is then uniaxially compressed into plates or bars. Uniaxial pressure conditions are between 10 and 50 MPa, pressure durations between a few seconds and 1 minute. The preformed green body is compacted in a cold isostatic press at a pressure between 100 and 300 MPa. The pressure transmitting medium is water or oil.

Subsequently, binding agent where required is burned away in a first thermal step. The duration and temperature of the heat treatment are in a range between 1 and 24 hours and temperatures between 600 and 1000° C. The burned green body is then sintered in a chamber furnace under oxygen flow, or selectively directly in air. The sintering temperatures and durations are based on the sintering behavior of the mixture, that means once the composition has been defined, further compression into a ceramic of defined porosity is accomplished. In the case of $Ce:Y_3Al_5O_{12}$ the garnet phase forms above about 1350 to 1450° C. Sintering into a ceramic body is accomplished at higher temperatures, between 1550° C. and 1800° C., for 2 to 24 hours.

In this manner, optically translucent and homogeneous bodies are produced which may be further processed to converter materials.

Example for Producing a Translucent $Lu_3(Al,Ga)_5O_{12}$ Ceramic Including $CeO_2$ by Uniaxial Compressing (with Reactive Sintering):

Powders comprising primary particles having diameters of less than 1 μm, preferably of nanoscale size (<300 nm) in diameter, of $Al_2O_3$, $Ga_2O_3$, $Lu_2O_3$, and $CeO_2$, are weighed in proportions according to the target composition. The target composition may vary around the stoichiometric range of the garnet composition, and may in particular extend by about 0.01 to 2.5 mol % to the $Lu_2O_3$-rich side or by 0.01 to 2.5 mol % to the $Al_2O_3/Ga_2O_3$-rich side. The $CeO_2$ is stoichiometrically calculated to the Lu site and ranges between 0.01 and 3 wt %. The $Ga_2O_3$ content is set off against the $Al_2O_3$ content and is between 0 and 20%. After addition of dispersing and binding agents, the mixture is mixed in a ball mill using ethanol and $Al_2O_3$ balls, for 12 to 16 hours. Prior to a second blending operation in a tumbler for 10 to 24 h, TEOS may be added to the mixture as a sintering aid, so that the equivalent of between 0 and 0.5 wt % of $SiO_2$ is employed.

The milled suspension is selectively dried on a rotary evaporator or granulated in a spray dryer.

The powder is then uniaxially compressed into plates or bars. Uniaxial pressure conditions are between 10 and 50 MPa, pressure durations between a few seconds and 1 minute. The preformed green body is compacted in a cold isostatic press at a pressure between 100 and 300 MPa. The pressure transmitting medium is water or oil.

Subsequently, binding agent where required is burned out in a first thermal step. The duration and temperature of the heat treatment are in a range between 1 and 24 hours and temperatures between 600 and 1000° C. The burned green body is then sintered in a chamber furnace under oxygen flow, or selectively directly in air. The sintering temperatures and durations are based on the sintering behavior of the mixture, that means once the composition has been defined, further compression into a ceramic of defined porosity is accomplished. In the case of $Ce:Y_3Al_5O_{12}$ the garnet phase forms above about 1350 to 1450° C. Sintering into a ceramic body is accomplished at higher temperatures, between 1550° C. and 1800° C., for 2 to 24 hours.

Exemplary Embodiments

Specific embodiments of the invention are listed as exemplary embodiments in table 3.

TABLE 3

| Exemplary embodiment | Reactant 1 (mol %) | Reactant 2 (mol %) | Reactant 3 (mol %) | Active element (wt %) | Blending in roller bench | Blending in tumbler | Sintering Aid |
|---|---|---|---|---|---|---|---|
| 1 | 37.41 $Y_2O_3$ | 62.50 $Al_2O_3$ | | 0.1 wt % $CeO_2$ | 16 h | 16 h | Non |
| 2 | 37.29 $Y_2O_3$ | 62.50 $Al_2O_3$ | | 0.23 wt % $Pr_6O_{11}$ + 0.2 wt % $CeO_2$ | 2 × 16 h | | 0.6 wt % TEOS |
| 3 | 37.47 $Lu_2O_3$ | 56.15 $Al_2O_3$ | 6.25 $Ga_2O_3$ | 0.1 wt % $CeO_2$ | 2 × 16 h | | 0.6 wt % TEOS |
| 4 | 37.22 $Y_2O_3$ | 62.50 $Al_2O_3$ | 0.19 $Gd_2O_3$ | 0.1 wt % $CeO_2$ | 16 h | 16 h | non |
| 5 | 37.33 $Lu_2O_3$ | 56.18 $Al_2O_3$ | 6.24 $Ga_2O_3$ | 0.2 wt % $CeO_2$ | 2 × 16 h | | non |
| 6 | 36.48 $Y_2O_3$ | 62.50 $Al_2O_3$ | 0.94 $Gd_2O_3$ | 0.1 wt % $CeO_2$ | 16 h | 16 h | non |
| 7 | 37.46 $Lu_2O_3$ | 49.98 $Al_2O_3$ | 12.50 $Ga_2O_3$ | 0.05 wt % $CeO_2$ | 2 × 16 h | | 0.6 wt % TEOS |
| 8 | 33.67 $Y_2O_3$ | 62.50 $Al_2O_3$ | 3.75 $Gd_2O_3$ | 0.1 wt % $CeO_2$ | 16 h | 16 h | non |
| 9 | 18.7 $Y_2O_3$ | 62.50 $Al_2O_3$ | 18.7 $Lu_2O_3$ | 0.1 wt % $CeO_2$ | 2 × 16 h | | 0.6 wt % TEOS |
| 10 | 37.46 $Y_2O_3$ | 62.50 $Al_2O_3$ | | 0.05 wt % $CeO_2$ | 24 h | | 0.3 wt % TEOS |

TABLE 3-continued

| Exemplary embodiment | Reactant 1 (mol %) | Reactant 2 (mol %) | Reactant 3 (mol %) | Active element (wt %) | Blending in roller bench | Blending in tumbler | Sintering Aid |
|---|---|---|---|---|---|---|---|
| 11 | 35.54 $Y_2O_3$ | 62.50 $Al_2O_3$ | 1.87 $Gd_2O_3$ | 0.1 wt % $CeO_2$ | 16 h | 16 h | non |
| 12 | 37.41 $Lu_2O_3$ | 59.34 $Al_2O_3$ | 3.12 $Ga_2O_3$ | 0.1 wt % $CeO_2$ | 2 × 16 h | | 0.6 wt % TEOS |
| 13 | 29.92 $Y_2O_3$ | 62.50 $Al_2O_3$ | 7.49 $Gd_2O_3$ | 0.1 wt % $CeO_2$ | 16 h | 16 h | non |
| 14 | 37.56 $Y_2O_3$ | 62.40 $Al_2O_3$ | | 0.05 wt % $CeO_2$ | 16 h | 16 h | 0.6 wt % TEOS |

What is claimed is:

1. A single-phase porous optoceramic, suitable for at least partially converting excitation light having a first wavelength into emitted light having a second wavelength, comprising:
    a ceramic phase $A_3B_5O_{12}$, with A selected from a group consisting of elements Y, Gd, Lu, and combinations thereof, and with B selected from a group consisting of elements Al, Ga, and combinations thereof, and containing Ce as at least one active element, wherein the optoceramic has a density, based on a theoretical density, of between 90 and 96.5%, wherein the pores have a polygonal shape, wherein the optoceramic has a thickness from 100 to 300 micrometers; and
    particles not integrated into the ceramic phase $A_3B_5O_{12}$ that are in a range from 0 vol % to less than 5 vol %,
    wherein the optoceramic is configured to at least partially convert the excitation light having the first wavelength into the emitted light having the second wavelength, wherein the emitted light is emitted from a side of the optoceramic on which the excitation light is incident,
    wherein the optoceramic is configured to remit and combine at least a portion of the excitation light with the emitted light,
    wherein the optoceramic exhibits, when measured at a sample thickness of 1 mm, a remission at 600 nm that is from 0.75 to 0.95,
    wherein the single-phase porous optoceramic is configured for operation in remission, and
    wherein the optoceramic exhibits a quantum efficiency that is greater than 85%.

2. The optoceramic as claimed in claim 1, wherein the particles not integrated into the ceramic phase $A_3B_5O_{12}$ are less than 1.5 vol %.

3. The optoceramic as claimed in claim 1, wherein a mean pore size is from 0.1 to 100 micrometers.

4. The optoceramic as claimed in claim 1, wherein the ceramic phase mainly comprises $Y_3Al_5O_{12}$ or $Lu_3Al_5O_{12}$.

5. The optoceramic as claimed in claim 1, wherein the ceramic phase additionally comprises yttrium and/or lutetium as a first element A and gadolinium as a second element A and/or wherein the content of $Gd_2O_3$ with respect to the A site is from 0.5 to 8 mol %.

6. The optoceramic as claimed in claim 1, wherein the ceramic phase comprises aluminum as a first element B and gallium as a second element B, and/or wherein the content of $Ga_2O_3$ is from 0.5 to 15 mol %.

7. The optoceramic as claimed in claim 1, wherein a cerium content is from 0.001 to 3 wt %.

8. The optoceramic as claimed in claim 1, wherein the optoceramic phase comprises a further active element selected from the group consisting of Pr, Sm, and Tb.

9. The optoceramic as claimed in claim 1, further comprising a thickness from 150 to 250 micrometers.

10. The optoceramic as claimed in claim 1, comprising a Ce content of from 0.01 to 3 wt %.

* * * * *